(12) United States Patent
Weilbacher

(10) Patent No.: US 12,034,746 B2
(45) Date of Patent: *Jul. 9, 2024

(54) SYSTEMS AND METHODS FOR AUTOMATED RETRIEVAL, PROCESSING, AND DISTRIBUTION OF CYBER-THREAT INFORMATION

(71) Applicant: Capital One Services, LLC, McLean, VA (US)

(72) Inventor: Nathan Weilbacher, Sherman, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/158,431

(22) Filed: Jan. 23, 2023

(65) Prior Publication Data

US 2023/0164155 A1    May 25, 2023

Related U.S. Application Data

(63) Continuation of application No. 16/799,294, filed on Feb. 24, 2020, now Pat. No. 11,588,828, which is a
(Continued)

(51) Int. Cl.
    *H04L 9/40*    (2022.01)
(52) U.S. Cl.
    CPC ...... *H04L 63/1416* (2013.01); *H04L 63/1408* (2013.01); *H04L 63/20* (2013.01)
(58) Field of Classification Search
    CPC .. H04L 63/1416; H04L 63/20; H04L 63/1408
    See application file for complete search history.

(56) References Cited

U.S. PATENT DOCUMENTS

| | | | |
|---|---|---|---|
| 6,453,345 B2 * | 9/2002 | Trcka | G06F 21/552 714/39 |
| 2009/0158430 A1 * | 6/2009 | Borders | G06F 21/552 726/23 |

(Continued)

OTHER PUBLICATIONS

NPL Search Terms (Year: 2023).*
NPL Search Terms (Year: 2024).*

*Primary Examiner* — Syed A Zaidi
(74) *Attorney, Agent, or Firm* — Perkins Coie LLP

(57) ABSTRACT

Systems and methods are provided for automated retrieval, processing, and/or distribution of cyber-threat information using a cyber-threat device. Consistent with disclosed embodiments, the cyber-threat device may receive cyber-threat information in first formats from internal sources of cyber-threat information using an accessing component of the cyber-threat device. The cyber-threat device may receive cyber-threat information second formats from external sources of cyber-threat information using an accessing component of the cyber-threat device. The cyber-threat device may process the received cyber-threat information in the first formats and the second formats into a standard format using a processing component of the cyber-threat device. The cyber-threat device may provide the processed items of cyber-threat information to a distributor using a distributing component of the cyber-threat device. The cyber-threat device may automatically report information concerning the processed items of cyber-threat information to a device of a user with a reporting component of the cyber-threat device.

20 Claims, 6 Drawing Sheets

Related U.S. Application Data continuation of application No. 16/181,292, filed on Nov. 5, 2018, now Pat. No. 10,574,677, which is a continuation of application No. 15/133,132, filed on Apr. 19, 2016, now Pat. No. 10,225,268.

(60) Provisional application No. 62/150,177, filed on Apr. 20, 2015.

(56) References Cited

U.S. PATENT DOCUMENTS

| | | | |
|---|---|---|---|
| 2012/0240236 A1* | 9/2012 | Wyatt | G06F 21/10 726/25 |
| 2014/0201836 A1* | 7/2014 | Amsler | H04L 63/20 726/23 |
| 2014/0331318 A1* | 11/2014 | Windsor | H04L 51/212 726/22 |
| 2015/0172311 A1* | 6/2015 | Freedman | H04L 63/20 726/1 |
| 2015/0172321 A1* | 6/2015 | Kirti | H04L 63/1425 726/1 |
| 2016/0119365 A1* | 4/2016 | Barel | G06F 16/95 726/12 |
| 2017/0230412 A1* | 8/2017 | Thomas | H04L 63/1416 |

* cited by examiner

SYSTEMS AND METHODS FOR AUTOMATED RETRIEVAL, PROCESSING, AND DISTRIBUTION OF CYBER-THREAT INFORMATION

CROSS-REFERENCE TO RELATED APPLICATIONS

This application is a continuation of U.S. patent application Ser. No. 16/799,294, filed Feb. 24, 2020, which is a continuation of U.S. patent application Ser. No. 16/181,292, filed on Nov. 5, 2018, which is a continuation of Ser. No. 15/133,132, filed Apr. 19, 2016, which claims priority from U.S. Provisional Patent Application No. 62/150,177 filed on Apr. 20, 2015, which is incorporated by reference in the present application.

TECHNICAL FIELD

The disclosed embodiments generally relate to computer security, and more specifically, to the automated retrieval, processing, and distribution of cyber-threat information.

BACKGROUND INFORMATION

Effective management of cyber threats requires a rapid, coordinated response. Otherwise, a delayed or patchwork response may permit cyber-aggressors to compromise unprotected systems and establish footholds to support subsequent attacks.

Communities may share cyber-threat information, permitting community members to collaborate to collectively detect and defend against cyber threats. But collective action against cyber threats may be hampered by, among other things, incompatible formats for collecting cyber-threat information and incompatible cyber-threat information distribution methods. Moreover, many communities have not automated the exchange of cyber-threat information. Such communities may instead rely on person-to-person distribution methods such as email, listservs, websites, chatrooms, discussion threads, wikis, RSS feeds; and real-time communication methods such as chat programs and telephonic communications. But these methods of communication fail to achieve the rapid response and scalability possible through automated machine-to-machine transmission of cyber-threat information. Unfortunately, communities implementing the automated exchange of cyber-threat information have failed to coalesce around a single standardized format and method of transmission. Automated exchanges of cyber threat information among members of these communities are therefore restricted to other members of the same community. These deficiencies prevent the widespread, automated distribution of cyber-threat information necessary to combat increasingly sophisticated cyber-aggressors. Thus, methods and systems are needed for automatically retrieving, converting, and distributing cyber-threat information.

SUMMARY

The disclosed embodiments may include, for example, methods and systems for collecting, processing, and distributing cyber-threat information. These methods and systems may receive cyber-threat information according to a plurality of protocols. The cyber-threat information may be provided in a plurality of formats. By automating the reception, processing, and distribution of cyber-threat information across a plurality of formats, and by integrating reporting and network control functionality, the disclosed methods and systems may permit rapid detection and response to cyber threats.

The disclosed embodiments may include, for example, a method for automated collection, dissemination, and/or reporting of cyber-threat information from a plurality of sources using a network device. The method may include receiving cyber-threat information in one or more first formats from at least one internal source of cyber-threat information using an accessing component of the cyber-threat device, and receiving cyber-threat information in one or more second formats from at least one external source of cyber-threat information using the accessing component of the cyber-threat device. The method may further include processing the received cyber-threat information in the one or more first formats and the one or more second formats into a standard format using a processing component of the cyber-threat device. The method may also include providing the processed cyber-threat information to a distributor using a distributing component of the cyber-threat device, and automatically reporting information concerning the processed cyber-threat information to a user device using a reporting component of the cyber-threat device.

In some embodiments, the at least one internal source of cyber threat may include at least one network component of an entity system. The accessing component of the cyber-threat device may receive cyber-threat information in the one or more first formats through Application Program Interfaces ("APIs") exposed by the network components. The at least one network component of the entity system may comprise a plurality of network components and the one or more first formats may include a plurality of first formats. The at least one network component of an entity may include a firewall appliance, router, intrusion detection system, fraud detection system, email appliance, webserver, proxy server, or security incident and event manager. The at least one network component of an entity may include a host system providing an email client, antivirus software, and/or anti-malware detector. The cyber-threat information in the one or more first formats may include a webserver log, an anti-spam log, an anti-virus log, an email delivery log, or a system log. The plurality of first formats may include one or more of a Common Log Format, Combined Log Format, or PST file. The accessing component of the cyber-threat device may implement one or more of a web service or a file system service to receive the one or more items of cyber-threat information in the one or more first formats. The implemented web service may include one or more of JSON-WSP or SOAP-WSDL. The implemented web service may be implemented as a representational state transfer web service.

In certain aspects, the at least one external source of cyber-threat information may comprise cyber-threat information generated by one or more of a commercial security provider, governmental regulatory agency, or governmental security agency.

In various aspects, the network device may implement the accessing component using a scripting language, and the accessing component may call libraries corresponding to the APIs exposed by the network components to receive the one or more items of cyber-threat information in the one or more first formats.

In certain aspects, the standard format may include an extensible description of cyber-threat information specifying observables, context, and data markings for items of cyber-threat information. The data markings may include information identifying the source and information describing handling restrictions for each of the items of cyber-threat information. The processing component of the cyber-threat device may apply exclusion criteria to determine one or more acceptable items of cyber-threat information from the retrieved one or more items of cyber-threat information in the one or more first formats, and the retrieved one or more items of cyber-threat information in the one or more second formats.

In some aspects, the distributor may expose an API for receiving the processed items of cyber-threat information. The distributor may receive the processed items of cyber-threat information using a web service.

In some aspects, reporting component configuration information may configure the reporting component with one or more of reporting targets, reporting criteria, and reporting frequencies. The reporting component configuration information may configure the reporting component to automatically instruct a network component of the entity system to modify a configuration of the network component. Automatically instructing one or more network components to update network component configurations may include instructing an email appliance to update a blacklist.

In some embodiments, the cyber threat device may include a policy engine configured to specify one or more users authorized to access cyber-threat information, cyber-threat information that may be accessed, methods of access to cyber-threat information, and permissible uses of accessed items of cyber-threat information. In various aspects, processing component configuration information may specify one or more identification criteria for cyber-threat information, and processing rules for cyber-threat information.

In some embodiments, the cyber threat device may include a display component of the cyber-threat device configured to provide instructions for displaying a user interface on a device of a user. The display component of the cyber-threat device may enable users without authorization to directly access the network components in order to access cyber-threat information received from the network components. The display component of the cyber-threat device may provide instructions to generate a user interface enabling users to configure one or more of the access component, processing component, distributing component, reporting component, and policy engine. Configuring the policy engine using the user interface may include one or more of managing policies for sources of cyber-threat information, categories of items of cyber-threat information, or items of cyber-threat information.

It is to be understood that both the foregoing general description and the following detailed description are exemplary and explanatory only and are not restrictive of the disclosed embodiments, as claimed.

BRIEF DESCRIPTION OF THE DRAWINGS

The drawings are not necessarily to scale or exhaustive. Instead, emphasis is generally placed upon illustrating the principles of the inventions described herein. The accompanying drawings, which are incorporated in and constitute a part of this specification, illustrate several embodiments consistent with the disclosure and together with the description, serve to explain the principles of the disclosure. In the drawings.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

Figure 1:
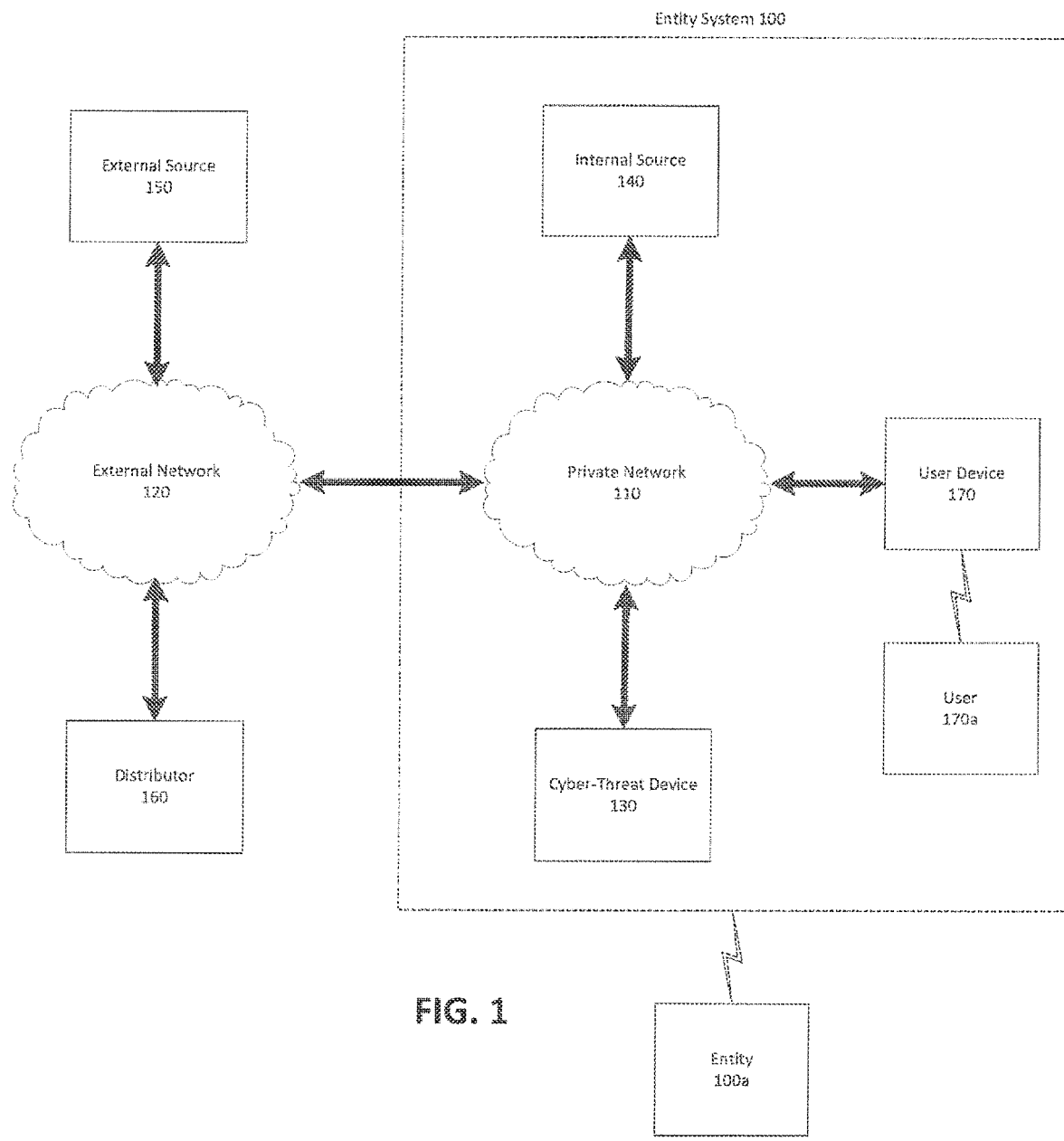
FIG. 1 depicts a diagram illustrating an exemplary system for automated collection, dissemination, and/or reporting of cyber-threat information, consistent with disclosed embodiments.

FIG. 1 depicts a diagram illustrating an exemplary system for automated collection, dissemination, and/or reporting of cyber-threat information, consistent with disclosed embodiments. The components and arrangement of the components described in connection with FIG. 1 may vary without departing from the scope of the disclosed embodiments. In certain embodiments, the system may include an entity system 100, a private network 110, an external network 120, a cyber-threat device 130, an internal source 140, an external source 150, a distributor 160, and a user device 170. Entity 100a may be associated with entity system 100. User 170a may be associated with user device 170. In some aspects, cyber-threat device 130 may automatically retrieve cyber-threat information from internal source 140 using private network 110. In certain aspects, cyber-threat device 130 may automatically retrieve cyber-threat information from external source 150 using one or more of external network 120 and private network 110. Cyber-threat information may be retrieved from external source 150 and internal source 140 using a plurality of retrieval protocols. Retrieved cyber-threat information may be presented in a plurality of formats. In various aspects, cyber-threat device 130 may process retrieved cyber-threat information into a standard format. Cyber-threat device 130 may distribute processed cyber-threat information to distributor 160. In some embodiments, cyber-threat device 130 may retrieve cyber-threat information in a standard format from distributor 160. In some embodiments, cyber-threat device 130 may be configured for automatic reporting of cyber-threat information. In certain aspects cyber-threat device 130 may automatically generate reports concerning received cyber-threat information. Cyber-threat device 130 may automatically provide such reports to user devices (e.g., user device 170).

Entity system 100 may comprise one or more computing systems configured to execute software instructions stored on one or more memory devices to perform one or more operations consistent with the disclosed embodiments. In one embodiment, entity system 100 may include one or more servers, which may be one or more computer devices configured to execute software instructions stored in memory to perform one or more processes consistent with the disclosed embodiments. For example, entity system 100 may include one or more memory device(s) storing data and software instructions and one or more processor(s) configured to use the data and execute the software instructions to perform server-based functions and operations known to those skilled in the art. Entity system 100 may include one or more general purpose computers, mainframe computers, or any combination of these types of components. In certain embodiments, entity system 100 may be configured as a particular apparatus, system, and the like based on the storage, execution, and/or implementation of the software instructions that perform one or more operations consistent with the disclosed embodiments. Entity system 100 may be standalone, or it may be part of a subsystem, which may be part of a larger system. For example, entity system 100 may represent distributed servers, network components, and user devices that are remotely located and communicate over a network (e.g., private network 110) or a dedicated network, such as a LAN, for an entity. In certain embodiments, entity system 100 may be a system configured to provide and/or manages financial service accounts, such as a bank, credit card company, brokerage firm, etc. consistent with the disclosed embodiments.

An entity 100a associated with entity system 100 may be a private or public entity concerned with collecting, processing, and distributing information regarding cyber security threats. In some aspects, entity 100a may be a private entity, such as a financial service provider or an industry group. For example, entity 100a may be a bank. As an additional example, entity 100a may be an industry group, such as the Financial Services Information Sharing and Analysis Center (FS-ISAC). In some aspects, entity 100a may be public entity, such as a federal, state, or local governmental body. For example, entity 100a may be an independent regulatory agency, such as the Federal Deposit Insurance Corporation (FDIC). As an additional example, entity 100a may be an executive agency, such as the Department of Homeland Security (DHS).

Private network 110 may be configured to provide communications within entity 100, consistent with disclosed embodiments. In some aspects, private network 110 may be configured to provide communications between cyber-threat device 130, internal source 140, and user device 170, as shown in FIG. 1. Each of cyber-threat device 130, internal source 140, and user device 170 may use private network 110 to access external network 120. Private network 110 may be any type of network (including infrastructure) that provides communications, exchanges information, and/or facilitates the exchange of information. For example, private network 110 may comprise one or more Local Area Networks, Wide Area Networks, virtual networks that extend a private network over a public network, such as VPN, or other suitable connection(s).

External network 120 may be configured to provide communications between entity 100, external source 150, and distributor 160, as shown in FIG. 1. For example, external network 120 may be any type of network (including infrastructure) that provides communications, exchanges information, and/or facilitates the exchange of information between entity 100, external source 150, and distributor 160. For example, external network 120 may be the Internet, a Local Area Network, or other suitable connection(s).

Cyber-threat device 130 may comprise one or more devices connected to private network 110 of entity system 100 for collection, dissemination, and/or reporting of cyber-threat information from a plurality of sources. Cyber-threat device 130 may include, but is not limited to, one or more general purpose computers, servers, network appliances, mainframe computers, or any combination of these types of components. Cyber-threat information may concern unauthorized attempts to access computer systems or information over a network (e.g., private network 110, external network 120, etc.). Cyber threats may originate within entity system 100. Cyber threats may originate remote from entity system 100. Cyber threats may originate from, as a non-limiting example, insiders (e.g., individuals associated with, or constituents of, entity 100a), national governments, terrorists, criminals (e.g., industrial spies or organized criminal groups), hackers, and/or activists.

Internal source 140 may be a source of cyber-threat information within entity system 100. Internal source 140 may generate cyber-threat information automatically or manually. For example, network components of entity system 100 may comprise automatic internal sources of cyber-threat information. As an additional example, cyber-threat device 130 may receive emails, reports, newsletters, messages, publications, or other communications provided by individuals associated with, or constituents of, entity 100a. These emails, reports, newsletters, messages, publications, and other communications may comprise manually-generated internal sources of cyber-threat information.

External source 150 may be a source of cyber-threat information outside entity system 100. External source 150 may generate cyber-threat information automatically or manually. For example, cyber-threat device 130 may receive cyber-threat information provided by an automatic reporting service. As an additional example, cyber-threat device 130 may receive emails, reports, newsletters, messages, publications, or other communications provided by an external community sharing cyber-threat information. Such an external community may include, for example, a membership based community, such as FS-ISAC for financial services providers, Microsoft's Active Protections Program (MAPP) for security software providers, or the Anti-Virus Information & Early Warning System (AVIEWS) for cyber security specialists. Such an external community may also include public communities sharing cyber-threat information, such a newsgroups, blogs, or similar communities. Communications from such external community may comprise manual externals sources of cyber-threat information.

Distributor 160 may comprise one or more computing systems that are configured to execute software instructions stored on one or more memory devices to perform one or more operations consistent with the disclosed embodiments. In one embodiment, distributor 160 may include one or more servers, which may be one or more computer devices configured to execute software instructions stored in memory to perform one or more processes consistent with the disclosed embodiments. For example, distributor 160 may include one or more memory device(s) storing data and software instructions and one or more processor(s) configured to use the data and execute the software instructions to perform server-based functions and operations known to those skilled in the art. Distributor 160 may include one or more general purpose computers, mainframe computers, or any combination of these types of components. In certain embodiments, Distributor 160 may be configured as a particular apparatus, system, and the like based on the storage, execution, and/or implementation of the software instructions that perform one or more operations consistent with the disclosed embodiments. Distributor 160 may be standalone, or it may be part of a subsystem, which may be part of a larger system. For example, Distributor 160 may represent distributed servers, network components, and user devices that are remotely located and communicate over a network (e.g., external network 120) or a dedicated network, such as a LAN, for an entity. In certain embodiments, distributor 160 may be a system configured to provide a clearinghouse for receiving and distributing cyber-threat information. In some embodiments, distributor 160 may be separate and distinct from entity system 100.

Distributor 160 may be configured to provide and receive cyber-threat information over a network (e.g., external network 120). Distributor 160 may be configured to expose an endpoint for providing and receiving cyber-threat information. For example, distributor 160 may be configured to expose a virtual inbox for reception of cyber-threat information using the endpoint. In certain aspects, the endpoint may be configured to receive cyber-threat information provided according to a transportation protocol, such as a web services protocol. For example, the endpoint may be configured to receive cyber-threat information provided according to the Trusted Automated eXchange of Indicator Information (TAXII™) protocol. Distributor 160 may be configured to handle cyber-threat information provided in a standard format. In certain aspects, the standard format may be the Structured Threat Information eXpression (STIX™) format. Distributor 160 may be configured to automatically process received cyber-threat information. Distributor 160 may be configured to periodically import information deposited into the virtual inbox into a database for distribution.

In certain embodiments, user device 170 may be a system that may be used by user 170a to communicate with other components of entity system 100. User 170a may operate user device 170, or direct operation of user device 170, consistent with disclosed embodiments. In some embodiments, user 170a may be an individual associated with, or a constituent of, entity 100a. User device 170 may include, but is not limited to, a general purpose computer or mainframe or a mobile computing device. Such a mobile computing device may include, but is not limited to, a cell phone, smart phone, personal digital assistant, tablet, or laptop. In some embodiments, first user device 170 may be a client device of another component of entity system 100.

Figure 2:
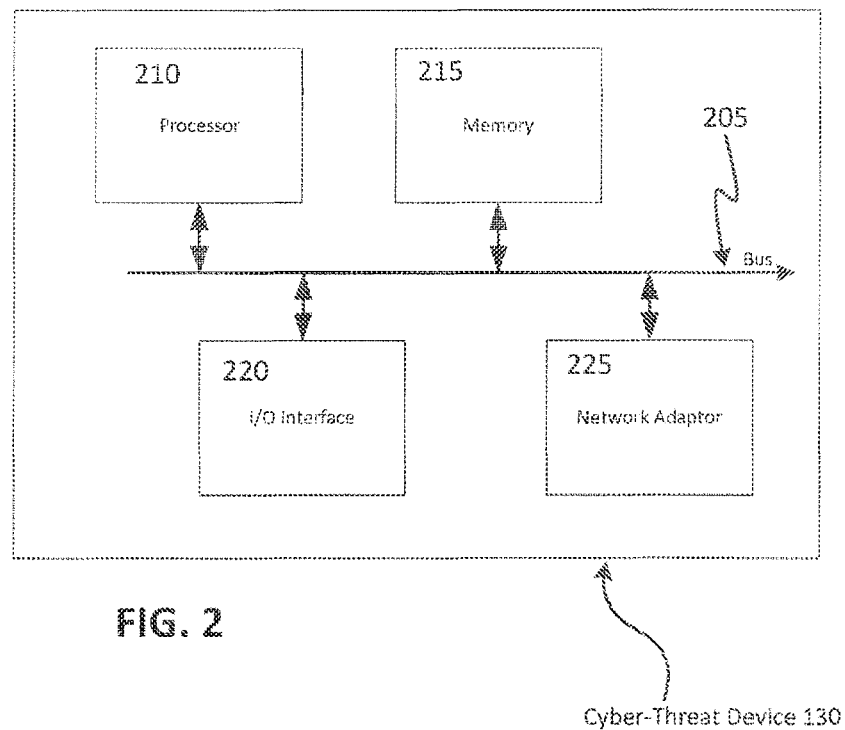
FIG. 2 depicts a diagram illustrating of an exemplary cyber-threat device according to some embodiments.

FIG. 2 depicts a diagram illustrating of an exemplary cyber-threat device consistent with disclosed embodiments. According to some embodiments, cyber-threat device 130 includes a processor 210, memory 215. I/O interface(s) 220, and network adapter 225. These units may communicate with each other via bus 205, or wirelessly. The components shown in FIG. 2 may reside in a single device or multiple devices.

In various embodiments, processor 210 may be one or more microprocessors or central processor units performing various methods in accordance to the embodiment. Memory 215 may include one or more computer hard disks, random access memory, removable storage, or remote computer storage. In various embodiments, memory 215 stores various software programs executed by processor 210. I/O interfaces 220 may include keyboard, a mouse, an audio input device, a touch screen, or an infrared input interface. Network adapter 225 enables cyber-threat device 130 to exchange information with private network 110 and with external network 120. In various embodiments, network adapter 225 may include a wireless wide area network adapter, or a local area network adapter.

Figure 3:
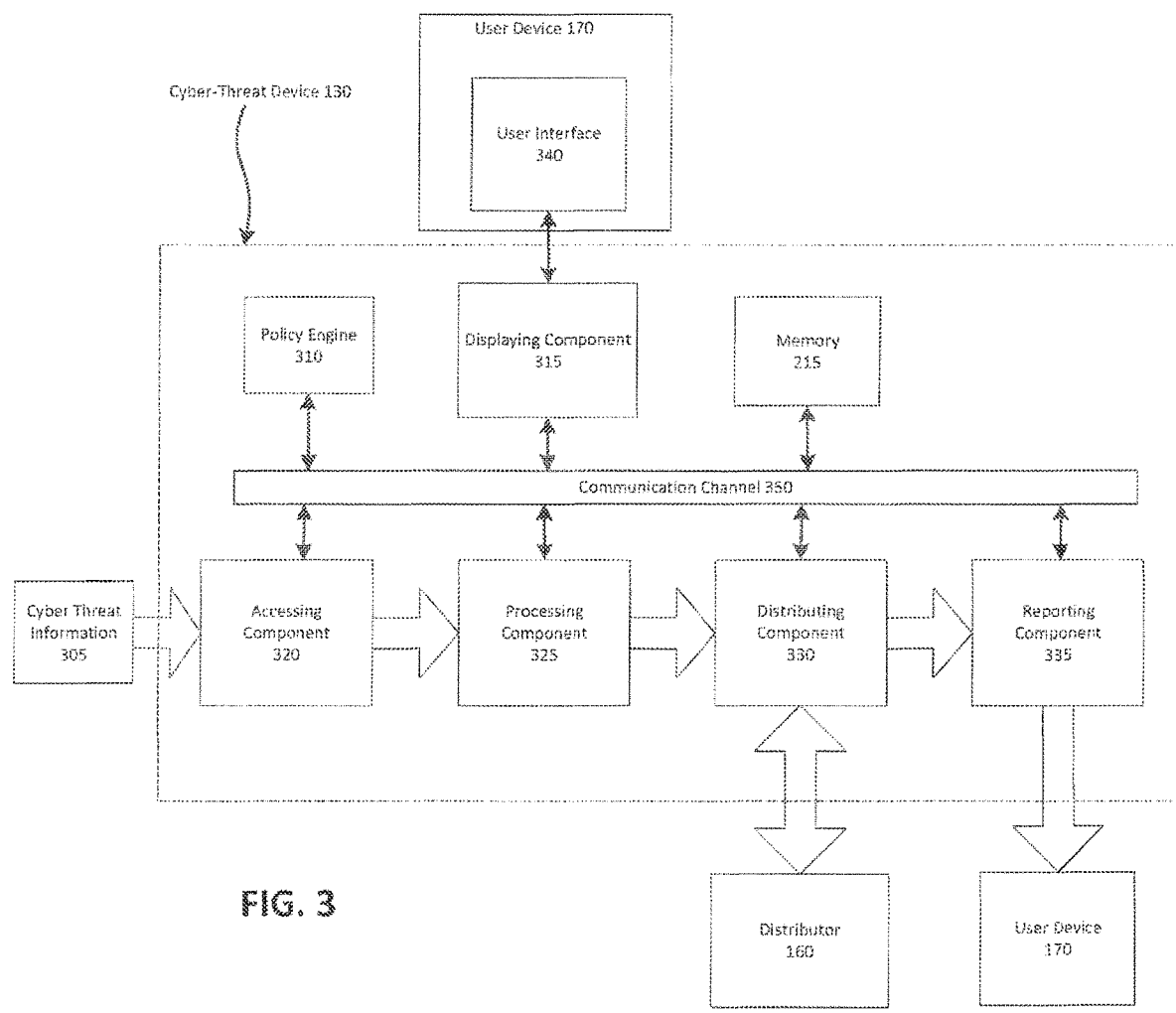
FIG. 3 depicts a schematic illustrating an exemplary system for collecting, processing, and distributing cyber-threat information using a cyber-threat device.

FIG. 3 depicts a schematic illustrating an exemplary system for collecting, processing, and distributing cyber-threat information using cyber-threat device 130, consistent with disclosed embodiments. This schematic illustrates the flow of information between components of cyber-threat device 130, and between cyber-threat device 130 and other components of entity system 100.

In some embodiments, accessing component 320 of cyber-threat device 130 may receive cyber-threat information 305. As described above with respect to FIG. 1, cyber-threat information 305 may be received from internal sources or external sources. In certain aspects, internal cyber-threat information 305 may be generated automatically or manually. For example, network components of entity system 100 may be configured to automatically generate cyber-threat information 305. In certain aspects, network components of entity system 100 may include one or more firewalls, routers, intrusion detection systems, fraud detection systems, email appliances (e.g., email scanners or gateways), servers (e.g., proxy servers or web servers, such as an apache webserver), and security incident and event managers. In some aspects, network components of entity system 100 may include host systems, such as user device 170, which may automatically generate cyber-threat information 305 using applications including intrusion detection systems, email clients, antivirus/malware detectors, and/or customized reporting applications.

In some aspects, cyber-threat information 305 generated by network components of the entity system 100 may comprise one or more log files, such as server logs (e.g., Apache webserver access logs), anti-spam logs, anti-virus logs, email logs (e.g., IronPort textmail logs), or system logs. In various aspects, cyber-threat information 305 generated by network components of the entity system 100 may comprise one or more archives, such as quarantine files or email archives (e.g., ".pst" files hosted on local systems). In certain aspects, cyber-threat information 305 generated by network components of the entity system 100 may comprise one or more blacklists/whitelists, audit records, and/or directory information.

In some embodiments, cyber-threat information 305 may be manually generated by individuals associated with, or constituents of, entity 100a. As described above with reference to FIG. 1, cyber-threat device 130 may receive emails, reports, newsletters, messages, publications, and/or other communications provided by individuals associated with, or constituents of, entity 100a. These emails, reports, newsletters, messages, publications, and/or other communications may comprise manually-generated internal sources of cyber-threat information.

In some embodiments, cyber-threat information 305 may be received from an external source. As described above with reference to FIG. 1, cyber-threat device 130 may receive cyber-threat information provided by an automatic reporting service. As an additional example, cyber-threat device 130 may receive emails, reports, newsletters, messages, publications, or other communications provided by an external community sharing cyber-threat information.

In some embodiments, cyber-threat device 130 may comprise policy engine 310. Cyber-threat device 130 may be configured to store a program in memory 215 defining policy engine 310. Cyber-threat device 130 may be configured to execute this program using processer 210 to implement policy engine 310. Cyber-threat device 130 may be configured to use policy engine 310 to govern access to cyber-threat information 305. Policy engine 310 may enforce policies governing access to cyber-threat information 305 based on policy rules and policy associations, described in detail below with respect to FIG. 4. In certain aspects, policy associations may indicate applicability of policy rules to sources of the cyber-threat information, categories of items of cyber-threat information, or items of cyber-threat information. In certain aspects, users (e.g., user 170a operating device 170) may manage policies by adding, modifying, and/or deleting policy rules. In some aspects, users (e.g., user 170a operating device 170) may manage policies by adding, modifying, and/or deleting policy associations. Policy rules and policy associations may reflect security, confidentiality, and/or privacy considerations.

Policy engine 310 may be configured to apply policy rules and associations to specify who may access cyber-threat information 305. Policy engine 310 may be configured to distinguish between providing cyber-threat information 305 to, for example, distributor 160, and providing cyber-threat information 305 to individuals associated with, or constituents of, entity 100a.

Policy engine 310 may be configured to apply policy rules and associations to specify what cyber-threat information 305 may be accessed. Policy engine 310 may be configured to distinguish between cyber-threat information 305 originating from internal sources and cyber-threat information 305 originating from external sources. For example, policy engine 310 may enforce first policy rules regarding distribution of cyber-threat information 305 originating from a webserver access log of entity system 100. Policy engine 310 may enforce second policy rules regarding distribution of cyber-threat information 305 originating from a ".pst" file of user 170a. Policy engine 310 may enforce third policy rules regarding distribution of cyber-threat information 305 originating from a DHS threat report. Policy engine 310 may be configured to distinguish between unprocessed cyber-threat information and processed cyber-threat information in a common format. In certain aspects, policy engine 310 may be configured to distinguish between types of unprocessed cyber-threat information. As a non-limiting example, policy engine 310 may distinguish between system logs, emails, webserver logs, and/or reports. Policy engine 310 may be configured to distinguish between accessing different portions of cyber-threat information. For example, policy engine 310 may enforce first policy rules regarding access to the body of an email and second policy rules regarding access to the header of the email.

Policy engine 310 may be configured to apply policy rules and associations to specify how cyber-threat information 305 may be accessed. Policy engine 310 may be configured to restrict access to particular methods of access or particular devices for access. For example, policy engine 310 may be configured to deny access to compromised devices. As another example, policy engine 310 may be configured to deny access to insecure devices, such as smartphones, computers, or other computer devices not connected to a private network (e.g., private network 110) of the entity (e.g., entity 100a), or a computing device lacking effective, up-to-date security software, such as antivirus software.

Policy engine 310 may be configured to apply policy rules and associations to specify permissible uses of cyber-threat information 305. Policy engine 310 may be configured to distinguish between display, editing, and/or deleting of cyber-threat information 305. For example, policy engine 310 may enforce first policy rules governing viewing cyber-threat information 305 by constituents of entity 100a, and enforce second policy rules governing distributing cyber-threat information 305 to distributor 160.

In some embodiments, cyber-threat device 130 may comprise display component 315. Cyber-threat device 130 may be configured to store a program in memory 215 defining display component 315. Cyber-threat device 130 may be configured to execute this program using processer 210 to implement display component 315. Cyber-threat device 130 may be configured to use display component 315 to provide instructions causing a user device (e.g., user device 170) to display a customized user interface 340. In some aspects, one or more of policy engine 310 or display component 315 may impose authentication requirements on use of customized user interface 340. In some embodiments, customized user interface 340 may enable users lacking authentication to access network components (e.g., user 170a) to access cyber-threat information 305 generated by such network components.

In some embodiments, cyber-threat device 130 may comprise accessing component 320. Cyber-threat device 130 may be configured to store a program in memory 215 defining accessing component 320. In certain aspects, the program may be written in a high level language. The high level language may be, for example, a scripting language. In some embodiments, the scripting language may be Python. Cyber-threat device 130 may be configured to execute the program using processer 210 to implement accessing component 320. Cyber-threat device 130 may be configured to use accessing component 320 to retrieve items of cyber-threat information 305. Accessing component 320 may be configured to store retrieved information in memory 215 associated with the system. For example, as described in further detail below with respect to FIG. 4, accessing component 320 may be configured to store retrieved information in database of cyber-threat information 410.

In certain aspects, accessing component 320 may be configured to automatically determine the appropriate method for retrieving cyber-threat information 305. For example, this determination may be based on the source of the cyber-threat information 305. As a further example, the source of the cyber-threat information 305 may be configured to publish a service description enabling the accessing component 320 to determine the appropriate method for retrieving cyber-threat information 305.

In various aspects, accessing component 320 may be manually configured with appropriate methods for retrieving cyber-threat information 305. For example, accessing component configuration information, described in detail with respect to FIG. 4 below, may include data or instructions causing accessing component 320 to retrieve cyber-threat information 305 with an appropriate method. In various aspects, the accessing component configuration information may correspond to the source of the cyber-threat information 305.

In some embodiments, accessing component 320 may be configured to retrieve cyber-threat information 305 from network components of entity system 100. In certain aspects, accessing component 320 may retrieve cyber-threat information 305 using an application programming interface. In some aspects, accessing component 320 may use at least one web service or file system service to retrieve cyber-threat information 305. This at least one web service or file system service may differ between network components. For example, accessing component 320 may be configured to retrieve cyber-threat information 305 from a first network component using a first web service implemented in JSON-WSP. As an additional example, accessing component 320 may be configured to retrieve cyber-threat information 305 from a second network component using a second web service implemented in SOAP-WSDL. In various aspects, accessing component 320 may be configured to access network components using web services implemented according to a representational state transfer (REST) web service architecture. One of skill in the art would recognize that numerous other web services and file system services may be used, and that this description is not intended to be limiting.

In certain aspects, the format of cyber-threat information 305 may differ between network components. For example, a first network component may provide cyber-threat information 305 using JSON. As an additional example, a second network component may provide cyber-threat information 305 using SOAP. As a further example, a third network component may provide cyber-threat information 305 using IMAP. One of skill in the art would recognize that numerous other protocols may be used, and that this description is not intended to be limiting.

In certain aspects, accessing component 320 may be configured to retrieve cyber-threat information 305 directly from network components of entity system 100. For example, accessing component 320 may retrieve webserver access logs directly from a file exposed on a directory of a webserver. In various aspects, accessing component 320 may retrieve items of cyber-threat information 305 indirectly from network components of entity system 100. For example, network components of entity system 100 may be configured to provide cyber-threat information to an intermediate network component. In some aspects, this intermediate component may comprise a security incident and event manager. For example, entity system 100 may comprises a plurality of webservers configured to forward access logs to a security incident and event manager. The security incident and event manager may collect the forwarded access logs. Security incident and event manager may generate processed access data from the forwarded access logs. In some aspects, accessing component 320 be configured to retrieve one or more of the forwarded access logs and the processed access data from the security incident and event manager. As an additional example network components of entity system 100 may forward system logs to a security incident and event manager. In some certain aspects, accessing component 320 be configured to retrieve one or more of the forwarded system logs and any processed system logs from the security incident and event manager.

In some embodiments, accessing component 320 may be configured to retrieve cyber-threat information 305 from external sources 150. In certain aspects, accessing component 320 may retrieve cyber-threat information 305 using an application programming interface. In some aspects, accessing component 320 may use at least one web service or file system service to retrieve cyber-threat information 305. This at least one web service or file system service may differ between external sources (e.g., external source(s) 150). For example, accessing component 320 may be configured to retrieve cyber-threat information 305 from a first external source using a first web service implemented in JSON-WSP. As an additional example, accessing component 320 may be configured to retrieve cyber-threat information 305 from a second external source using a second web service implemented in SOAP-WSDL. As a further example, accessing component 320 may be configured to retrieve cyber-threat information 305 from a third external source using a third web service implemented in TAXII™. In various aspects, accessing component 320 may be configured to access external sources using web services implemented according to a representational state transfer (REST) web service architecture. One of skill in the art would recognize that numerous other web services and file system services may be used, and that this description is not intended to be limiting.

In certain aspects, the format of cyber-threat information 305 may differ between external sources. For example, a first external source may provide cyber-threat information 305 using JSON. As an additional example, a second external source may provide cyber-threat information 305 using SOAP. As a further example, a third external sources may provide cyber-threat information 305 using STIX™. One of skill in the art would recognize that numerous other protocols may be used, and that this description is not intended to be limiting.

In some embodiments, accessing component 320 may be configured to receive cyber-threat information 305 provided manually. In certain aspects, accessing component 320 may be configured to accept documents uploaded to cyber-threat device 130. In some aspects, accessing component 320 may cooperate with display component 315 to provide instructions for user interface 340 to display interface elements for receiving cyber-threat information 305. In various aspects, user interface 340 may be configured to enable uploading of cyber-threat information 305. For example, non-limiting example, user interface 340 may display a drop location and the user may drag a PDF of a DHS threat report onto that drop location to manually provide information to cyber-threat device 130. In certain aspects, user interface 340 may be configured to accept the provision of URLs or IP addresses. For example, cyber-threat device 130 may be configured to access a webpage pointed to by a provided URL, and scrape the webpage for cyber-threat information 305. External sources may manually provide cyber-threat information 305. Internal sources may manually provide cyber-threat information 305.

In some embodiments, cyber-threat device 130 may comprise processing component 325. Cyber-threat device 130 may be configured to store a program in memory 215 defining processing component 325. In certain aspects, the program may be written in a high level language. The high level language may be, for example, a scripting language. In some embodiments, the scripting language may be Python. Cyber-threat device 130 may be configured to execute the program using processer 210 to implement processing component 325. Cyber-threat device 130 may be configured to use processing component 325 to process retrieved cyber-threat information 305. Processing component 325 may be configured to process cyber-threat information 305 into a standard format. In certain aspects, the standard format may be the format used by distributor 160. For example, the standard format may be STIX™.

In certain aspects, processing component 325 may be configured to automatically determine the appropriate method for processing cyber-threat information 305. For example, this determination may be based on the format of the cyber-threat information 305. For example, processing component 325 may detect that cyber-threat information 305 comprises webserver access logs in Common Log Format. Processing component 325 may then implement scripts for converting webserver access logs in Common Log Format into indicators in STIX™.

In various aspects, processing component 325 may be manually configured with appropriate methods for retrieving cyber-threat information 305. For example, as described below with respect to FIG. 5, cyber-threat device 130 may be configured to use processing component configuration information 460 stored in memory 215 to control processing of cyber-threat information 305. In some aspects, processing component configuration information 460 may include data or instructions causing processing component 325 to process cyber-threat information 305 into the standard format. For example, the processing component configuration information 460 may correspond to one or more of the source and format of the cyber-threat information 305. In various aspects, component configuration information 460 may store exclusion criteria. For example, processing component 325 may be configured to exclude all or some of cyber-threat information 305 satisfying the stored exclusion criteria.

In some embodiments, processing component 325 may be configured to generate processed cyber-threat information. In certain aspects, the relationship between retrieved cyber-threat information 305 and processed cyber-threat information may not be one-to-one. For example, processing component 325 may be configured to generate multiple items of processed cyber-threat information from an item of cyber-threat information 305. As an additional example, processing component 325 may be configured to generate an item of processed cyber-threat information from multiple items of cyber-threat information 305. In various aspects, processed cyber-threat information may not include all information in the cyber-threat information from which it is generated. In some aspects, processed cyber-threat information may only include portions of cyber-threat information 305. For example, an item of processed cyber-threat information concerning an email may not include the contents of the email. As an additional example, an item of processed cyber-threat information concerning a webserver access log in Apache Combined Log Format may only include portions of the webserver access log. For example, the item of processed cyber-threat information may only include the IP address of the remote host and the HTTP request header. In some aspects, as described below with reference to FIG. 5, retrieved cyber-threat information 305 may not include information present in processed cyber-threat information. For example, processed cyber-threat information may include context and data markings.

In some embodiments, cyber-threat device 130 may comprise distributing component 330. Cyber-threat device 130 may be configured to store a program in memory 215 defining distributing component 330. In certain aspects, the program may be written in a high level language. The high level language may be, for example, a scripting language. In some embodiments, the scripting language may be Python. Cyber-threat device 130 may be configured to execute the program using processer 210 to implement distributing component 330. Cyber-threat device 130 may be configured to use distributing component 330 to distributed processed cyber-threat information 305 to distributor 160.

In certain aspects, distributing component 330 may be configured to provide processed cyber-threat information according to a policy enforced by policy engine 310. In some aspects, distribution component 330 may automatically determine the appropriate method for providing processed cyber-threat information to distributor 160. For example, distributing component 330 may determine an appropriate method for providing processed cyber threats based on a service description published by distributor 160. In various aspects, distributing component 330 may be manually configured using distributing component configuration information 470 as described below with respect to FIG. 4.

In certain aspects, distribution component 330 may be configured to provide cyber-threat information 305 to distributor 160 using a web service. The web service may be designed for the exchange of cyber-threat information. The web service may implement a non-proprietary standard for exchanging cyber-threat information. For example, the web service may implement TAXII™. The web service may be message based. In certain aspects, the messages may be in a format designed for the exchange of cyber-threat information. The messages may implement a non-proprietary standard for exchanging cyber-threat information, such as STIX™.

In certain aspects, one or more of distributing component 330 and accessing component 320 may be configured to retrieve cyber-threat information 305 from distributor 160. The one or more of the distributing component 330 and accessing component 320 may retrieve the cyber-threat information 305 from distributor 160 using a web service. The web service may be designed for the exchange of cyber-threat information. The web service may implement a non-proprietary standard for exchanging cyber-threat information. For example, the non-proprietary standard may be TAXII™. The web service may be message based. In certain aspects, the messages may be in a format designed for the exchange of cyber-threat information. The messages may implement a non-proprietary standard for exchanging cyber-threat information, such as STIX™. The one or more of distributing component 330 and accessing component 320 may be configured to store some or all of the received cyber-threat information 305 in memory 215.

In some embodiments, cyber-threat device 130 may comprise reporting component 335. Cyber-threat device 130 may be configured to store a program in memory 215 defining reporting component 335. In certain aspects, the program may be written in a high level language. For example, the high level language may be a scripting language, such as Python. Cyber-threat device 130 may be configured to execute the program using processer 210 to implement reporting component 335. Cyber-threat device 130 may be configured to use reporting component 335 to report information to distributor 160. In certain aspects, the information may be cyber-threat information 305. In some aspects, the information may be processed cyber-threat information. Reporting component 335 may be configured to provide automatic content reporting capabilities. As described below with respect to FIG. 4, reporting component configuration information store parameters describing automatic content reporting.

In certain aspects, reporting component 335 may be configured to expose an API. The API may enable cyber-threat device 130 to provide data to other applications. The data may be cyber threat data. In certain aspects, cyber-threat device 130 may be configured to provide data to a visualization tool. For example, cyber-threat device 130 may provide cyber threat data to a visualization tool in response to a query. The query may be received by cyber-threat device 130 from user device 170. The query may concern cyber-threat information (e.g., cyber threat sources; infrastructure, such as IP addresses, domain names, and mail servers; threats; or threat descriptions, such as cyber threat tactics, techniques, and procedures). In some aspects, visualization tool may comprise an independent software module, such as Maltego™. In certain aspects, reporting component 335 may interact with display component 315 to provide cyber-threat information. For example, reporting component 335 may interact with display component 315 to provide instructions for displaying user interface 340 on user device 170.

In some embodiments, customized user interface 340 may be configured to enable users (e.g., user 170a operating user device 170) to modify one or more components of cyber-threat device 130. In certain aspects, customized user interface 340 may enable users to configure policy engine 310. For example, customized user interface 340 may enable users (e.g., user 170*a* operating user device 170) to manage policy rules and policy associations.

In some embodiments, customized user interface 340 may enable users (e.g., user 170*a* operating user device 170) to cause operating user device 170 to display one or more sources of cyber-threat information and create, edit, or delete one or more policy rules or policy associations for the one or more sources of cyber-threat information. As another example, customized user interface 340 may display relationships between sources of cyber-threat information. For example, customized user interface 340 may display a schematic depicting the network components of entity system 100. The schematic may display the role of network components and the flow of information between network components. In some aspects, customized user interface 340 may indicate policy restrictions for sources of cyber-threat information.

In certain embodiments, customized user interface 340 may enable users (e.g., user 170*a* operating user device 170) to cause operating user device 170 to display one or more categories of cyber-threat information and create, edit, and/or delete one or more policy rules or policy associations for the one or more categories of cyber-threat information. Categories of items of cyber-threat information may include processed cyber-threat information in a common format and various types of unprocessed cyber-threat information in a plurality of formats. For example, customized user interface 340 may display relationships between categories of cyber-threat information. In some aspects, customized user interface 340 may indicate policy restrictions for categories of cyber-threat information.

In various embodiments, customized user interface 340 may enable users (e.g., user 170*a* operating user device 170) to cause operating user device 170 to display one or more individual items of cyber-threat information and create, edit, and/or delete one or more policy rules or policy associations for the one or more individual items of cyber-threat information. As another example, customized user interface 340 may display relationships between individual items of cyber-threat information. In some aspects, customized user interface 340 may indicate policy restrictions for categories of cyber-threat information. In certain embodiments, customized user interface 340 may enable management of policy rules and policy associations concerning combinations of two or more of sources of cyber-threat information, categories cyber-threat information, and individual items cyber-threat information.

In certain aspects, customized user interface 340 may enable users to configure accessing component 320. For example, user 170*a* may interact with customized user interface 340 on user device 170 to add, modify, and/or delete accessing component configuration information. For example, authentication credentials may be added, modified, and/or deleted using customized user interface 340. In some embodiments, customized user interface 340 may enable users (e.g., user 170*a* operating user device 170) to configure processing component 325. For example, user 170*a* may interact with customized user interface 340 on user device 170 to add, modify, and/or delete processing component configuration information. In some embodiments, customized user interface 340 may enable users (e.g., user 170*a* operating user device 170) to configure distributing component 330. For example, user 170*a* may interact with customized user interface 340 on user device 170 to add, modify, and/or delete distributing component configuration information. In some embodiments, customized user interface 340 may enable users (e.g., user 170*a* operating user device 170) to configure reporting component 335. For example, user 170*a* may interact with customized user interface 340 on user device 170 to add, modify, and/or delete reporting component configuration information.

In some embodiments, communications channel 350 may enable components of cyber-threat device 130 to interact and share information. Communications channel 350 may be realized as a logical structure in software. Communications channel 350 may be described by a program stored in memory 215. Cyber-threat device 130 may implement communications channel 350 by executing the program stored in memory 215. This description of communications channel 350 is not intended to be limiting, one of skill in the art would recognize many ways of implementing communications channel 350 to enable components of cyber-threat device 130 to interact and share information.

The above description of cyber-threat device 130 is not intended to be limiting. One of skill in the art would recognize that multiple architectures may be used to implement the disclosed subject matter. For example, cyber-threat device 130 may combine, divide, add, and/or remove one or more of the policy engine and the accessing, processing, distributing, reporting, and displaying components, consistent with disclosed embodiments.

Figure 4:
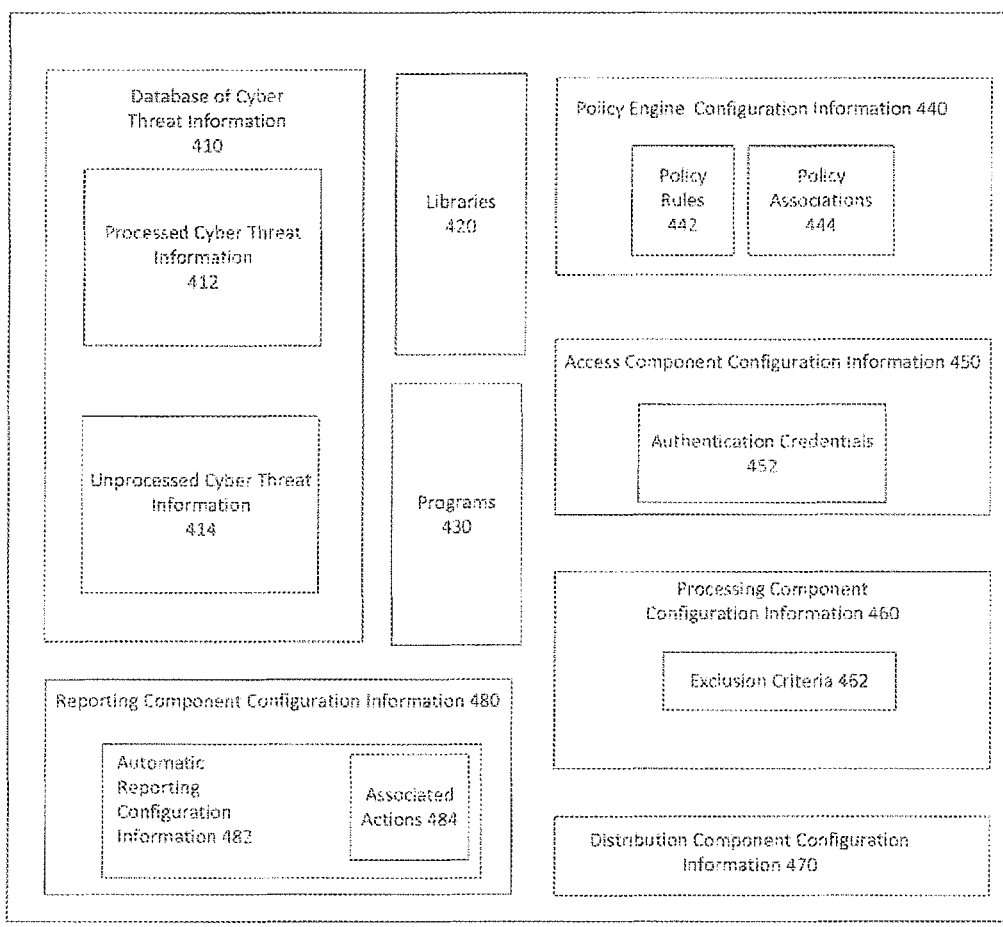
FIG. 4 depicts an exemplary memory of a cyber-threat device.

FIG. 4 depicts an exemplary memory 215 of cyber-threat device 130, consistent with disclosed embodiments. As discussed above with respect to FIG. 2, memory 215 may comprise multiple devices, or a single device. For example, memory 215 may comprise a single logical memory physically located on multiple devices. Memory 215 may also comprise multiple logical memories accessed consistent with disclosed embodiments.

In some embodiments, memory 215 may include cyber-threat information database 410. Cyber-threat information database may store cyber-threat information received by cyber-threat device. As a non-limiting example, cyber-threat information database 410 may be implemented as a hierarchical database, relational database, object-oriented database, document-oriented database, graph-oriented database, or key-value database. One of skill in the art would recognize that many suitable database implementations are possible. Cyber-threat information database may store processed cyber-threat information 412. Cyber-threat information database may store unprocessed cyber-threat information 414. In some aspects, processed cyber-threat information 412 may be stored in a logically distinct portion of cyber-threat information database 410. In certain aspects, processed cyber-threat information 412 and unprocessed cyber-threat information 412 may be stored in the same logical portion of cyber-threat information database 410.

In some embodiments, processed cyber-threat information 412 may be stored in a standard format. The standard format may be designed for storing cyber-threat information. The standard format may be STIX™. In some embodiments, unprocessed cyber-threat information 412 may be stored in a plurality of formats. The plurality of formats may correspond to the sources of cyber-threat information. For example, web server access logs may be stored as text files. As an additional example, local email archives may be stored as ".pst" files. As a further example, DHS threat reports may be stored as PDF files. Some unprocessed cyber-threat information 412 may be stored in an intermediate format, different from the format in which the cyber-threat information was received. For example, cyber-threat device 130 may flatten HTML-formatted email and store the resulting text files. As another example, cyber-threat device 130 may store portions of the resulting text files, such as header information and hashes of email attachments.

In some embodiments, memory 215 may be configured to store libraries 420. Components of cyber-threat device 130 may use libraries 420 to extend functionality, consistent with disclosed embodiments. In some aspects, components of cyber-threat device 130 may use libraries 420 to retrieve provide cyber threat data 305 from one or more of internal source 140, external source 150, distributor 160, and/or user device 170. In various aspects, components of cyber-threat device 130 may use libraries 420 to provide cyber threat data 305 to one or more of internal source 140, distributor 160, and/or user device 170. In some aspects, components of cyber-threat device 130 may use libraries to process cyber threat data 305 into processed cyber threat data 414. For example processing component 325 may access libraries 420 for functionality to convert to or from a standard threat expression format, such as STIX™, CAPEC, IDMEF, IODEF, OpenIOC. Oval, MAEC, Veris, or Yara. Libraries may be written in a plurality of computer languages. As a non-limiting example, libraries may include a Taxii™ library (e.g., libtaxii), a Pig workflow library, a Lipstick visualization library, an FS file system library, a RESTful API library, a JSON library, a STIX™ library (e.g., python-stix). This description is not intended to be limiting: other additional or alternative libraries providing convenient functionality would be envisioned by one of skill in the art.

In some embodiments, memory 215 may be configured to store programs 430. As described with reference to FIG. 3, the components of cyber-threat device 130 may be described by one or more programs. Cyber-threat device 130 may execute the one or more programs to implement the components of cyber-threat device. In some aspects, the one or more programs may comprise a single program. In certain aspects, the one or more programs may be stored in memory 215.

In some embodiments, cyber-threat device 130 may be configured to store policy engine configuration information 440 in memory 215. As described with reference to FIG. 3 above, policy engine 310 may enforce a policy according to policy rules. Cyber-threat device 103 may store policy rules 442 as data or instructions in policy engine configuration information 440. Cyber-threat device 103 may store policy associations 444 as data or instructions in policy engine configuration information 440. Policy engine 310 may apply policy rules 442 according to policy associations 444. In certain aspects, policy associations 444 may indicate applicability of policy rules 442 to one or more of cyber-threat information sources, categories cyber-threat information, or items of cyber-threat information. For example, a first policy association may associate a first policy rule with first web servers, a second rule with a second webservers, and a third rule with a subset of email accounts on an email appliance. As a further example, policy engine configuration information 440 may store a first policy association linking a policy rule prohibiting distribution to intrusion attempts detected by an intrusion detection system on private network 110 of entity system 100.

In some embodiments, cyber-threat device 130 may be configured to store accessing component configuration information 450 as data or instructions in memory 215. In certain aspects, accessing component configuration information 450 may configure accessing component 320 to call one or more of libraries 420 to access sources of cyber-threat information, such as external source 150 and internal source 140. In some aspects, accessing component configuration information 450 may include network component authentication credentials 452. Authentication credentials 452 may comprise data or instructions for authenticating access to sources of cyber-threat information. For example, authentication credentials 452 may include credentials for accessing one or more of internal source 140, external source 150, and distributor 160. As an additional example, authentication credentials 452 may include credentials for accessing network components of entity network 100. Credentials may include usernames, passwords, authentication tokens, or other data or instructions supporting authentication as known by one of skill in the art.

In some embodiments, cyber-threat device 130 may be configured to store processing component configuration information 460 as data or instructions in memory 215. Consistent with disclosed embodiments, processing component configuration information 460 may specify identification criteria for processing cyber-threat information. For example, processing component configuration information 460 may specify how relevant portions of unprocessed cyber-threat information 414 may be identified and processed. In certain aspects, processing component 325 may be configured to call libraries 420 according to the processing component configuration information 460. In certain aspects, processing component configuration information 460 may configure processing component 325 to convert unprocessed cyber-threat information 414 to or from standard threat expression formats, such as STIX™, CAPEC. IDMEF, IODEF, OpenIOC, Oval, MAEC, Veris, and Yara. In certain aspects, cyber-threat device 130 may be configured to store exclusion criteria 462 as data or instructions in processing component configuration information 460. Exclusion criteria 462 may include instructions preventing processing component 325 from processing duplicate information. Exclusion criteria 462 may include instructions preventing processing component 325 from processing cyber-threat information with certain characteristics. For example, exclusion criteria 462 may configure processing component 325 to exclude information associated with one or more of entity 100a and entity system 100 from processing. As an additional example, exclusion criteria 462 may configure processing component 325 to exclude from processing IP addresses of entity system 100, or URLs pointing to resources on entity system 100.

In some embodiments, cyber-threat device 130 may be configured to store distribution component configuration information 470 as data or instructions in memory 215. Consistent with disclosed embodiments, distribution component configuration information 470 may configure distribution component 330 to call one or more libraries to distribute processed cyber-threat information 412. For example, distribution component configuration information 470 may configure distributing component 330 to call a library to handle web services routines for communicating with distributor 160. As and additional example, distribution component configuration information 470 may configure distributing component 330 to call a TAXII™ library, such as libtaxii, to handle generation, transmission, and/or reception of TAXII™ messages.

In some embodiments, cyber-threat device 130 may be configured to store reporting component configuration information 480 as data or instructions in memory 215. Reporting component configuration information 480 may configure an API exposed by cyber-threat device 130 for use with a visualization tool. In certain aspects, automatic reporting configurations 482 may be stored as data or instructions in component configuration information 480. In certain aspects, automatic reporting configurations 482 may configure reporting component 335 to automatically generate reports. Reporting component 335 may be configured to provide automatically generated reports to users (e.g., users 170*a*).

Reporting targets may be stored as data or instructions in automatic reporting configurations 482. Reporting targets may specify recipients of automatically generated reports. In some aspects, reporting targets may specify divisions of entity 100*a*. For example, reporting targets may specify a Security Intelligence Center of the entity 100*a* as the recipient of an automatically generated report. As an additional example, reporting targets may specify individuals associated with, or constituents of, entity 100*a* as recipients of an automatically generated report. In various aspects, reporting targets may specify network components of entity system 100 as recipients of automatically generated reports.

Reporting component 335 may be configured to provide automatically generated reports in response to an event. In certain aspects, one or more automatic reporting criteria may be stored as data or instructions in automatic reporting configurations 482. Reporting component 335 may be configured to automatically generate a report upon satisfaction of one or more of the automatic reporting criteria. In certain aspects, automatic reporting criteria may concern cyber-threat information. For example, reporting component 335 may be configured to generate reports upon receipt of cyber-threat information 305 satisfying automatic reporting criteria. As an additional example, receipt of a predetermined number of emails containing computer viruses within a predetermined time may satisfy automatic reporting criteria, causing reporting component 335 to automatically generate and provide a report according to automatic reporting configurations 482. For example, receipt of 800 emails containing a particular computer virus in a day may cause reporting component 335 to automatically generate and provide a report detailing the virus to a Security Intelligence Center of the entity 100*a*.

Reporting component 335 may be configured to periodically provide automatically generated reports. One or more automatic reporting frequencies may be stored as data or instructions in automatic reporting configurations 482. The automatic reporting frequencies may correspond to reports that may be automatically generated. For example, reporting component 335 may be configured to generate a daily, weekly, and/or monthly report detailing attempted intrusions into entity system 100.

In various aspects, associated actions 484 may be stored as data or instructions in component configuration information 480. In certain aspects, associated actions 484 may configure reporting component 335 to automatically provide instructions to network components of entity system 100. In some aspects, network components of entity system 100 may be configured to automatically update the configuration of entity system 100 based on the automatically provided instructions. For example, reporting component 335 may be configured to automatically instruct email appliances to update email server blacklists. Reporting component 335 may be configured to provide such instructions periodically. Reporting component 335 may be configured to provide such instructions in response to an event, such as satisfaction of automatic reporting criteria. In certain aspects, system may require user confirmation to implement automatic instructions.

The above description is not intended to be limiting. One of ordinary skill in the art would appreciate that aspects of the disclosed embodiments may be implemented in a variety of ways. For example, the above-referenced components of memory 215 may be combined, divided, omitted, and/or modified without departing from the envisioned scope of the disclosed embodiments. In some aspects, memory 215 may comprise additional elements for performing the disclosed embodiments.

Figure 5:
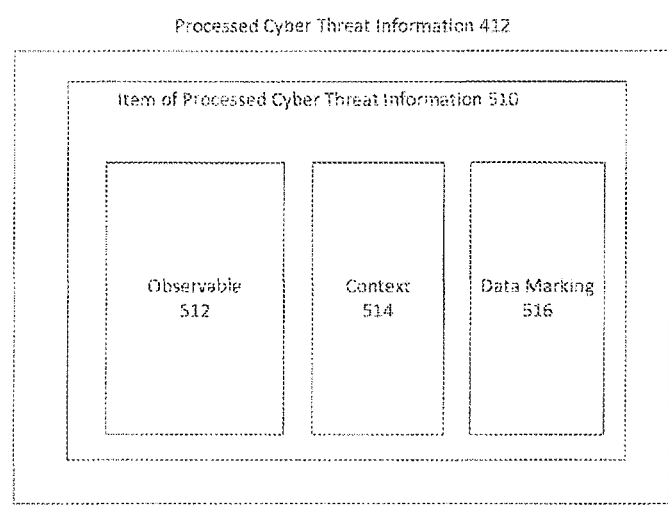
FIG. 5 depicts a schematic of an exemplary item of processed cyber-threat information, consistent with disclosed embodiments.

FIG. 5 depicts a schematic of an exemplary item of processed cyber-threat information, consistent with disclosed embodiments. In certain aspects, item of processed cyber-threat information 510 may be stored in a standard format. This standard format may provide an extensible description of cyber-threat information. As a non-limiting example, the standard format may support taxonomies of attack patterns, for describing and characterizing security incidents, behaviors, and artifacts. Consistent with disclosed embodiments, the standard format may be STIX™. In some embodiments, the standard format may be CAPEC, IDMEF, IODEF, OpenIOC, Oval, MAEC, Veris, or Yara. The above-referenced selection of standard formats is not intended to be limiting, as would be recognized by one of skill in the art.

The standardized format may specify observables 512, consistent with disclosed embodiments. Observables 512 may comprise standardized descriptions of artifacts or events. In some aspects, observables 512 may satisfy a schema for the specification, capture, characterization, and communication of events or stateful properties that are observable in the operational domain. For example, observables 512 may include IP addresses, domain names, file names, or email information. Email information may include header information. Header information may include, for example, one or more of routing information; sender, recipient, date and subject; time stamps; and/or mail transfer agent information. In some aspects, observables may be implemented as Cybox elements.

The standardized format may specify context 514, consistent with disclosed embodiments. Context 514 may comprise information identifying the cyber-threat information. In some aspects, the identification may be generated by a cryptographic hash function. For example, the identifier may be generated by an MD5 hash function. As an additional example, the identifier may be generated by an SHA hash function. In certain aspects, the standardized format may specify that the context 514 is associated with the observables. For example, the context 514 may be bundled with the observables. Consistent with disclosed embodiments, context 514 may comprise additional information describing the cyber threat. For example, additional information may describe cyber threat sources; cyber threat incidents (e.g., discrete instances of cyber threats); cyber threat targets; tactics, tools, and procedures used by cyber threat sources; high-level descriptions of collections of related cyber threats (e.g., campaigns prosecuted by cyber threat sources); detection procedures for cyber threats; and/or remediation procedures for cyber threats. One of skill in the art would recognize that this information is not intended to be limiting, and that other types of information may be included, consistent with disclosed embodiments.

The standardized format may specify data marking 516, consistent with disclosed embodiments. In some aspects, data marking 516 may include information producer tags. Information producer tags may identify the source of the information. In various aspects, data marking 516 may include handling restrictions. Handling restrictions may include, for example, one or more of transfer restrictions and expiration information. In certain aspects, data marking 516 may implement a Traffic Light Protocol. The Traffic Light Protocol may categorize processed cyber-threat information by level of restrictions on transfer. For example, red level data may be the most highly restricted, amber level data may be less restricted than red level data, green level data may be even less restricted than amber level data, and white level data may be unrestricted. As an additional example, red level processed cyber-threat information may not be provided to distributor 160, amber level processed cyber-threat information may be distributed only to trusted partnering entities, green level processed cyber-threat information may generally be shared with relevant entities, and white level processed cyber-threat information may be provided to the press or public.

Figure 6:
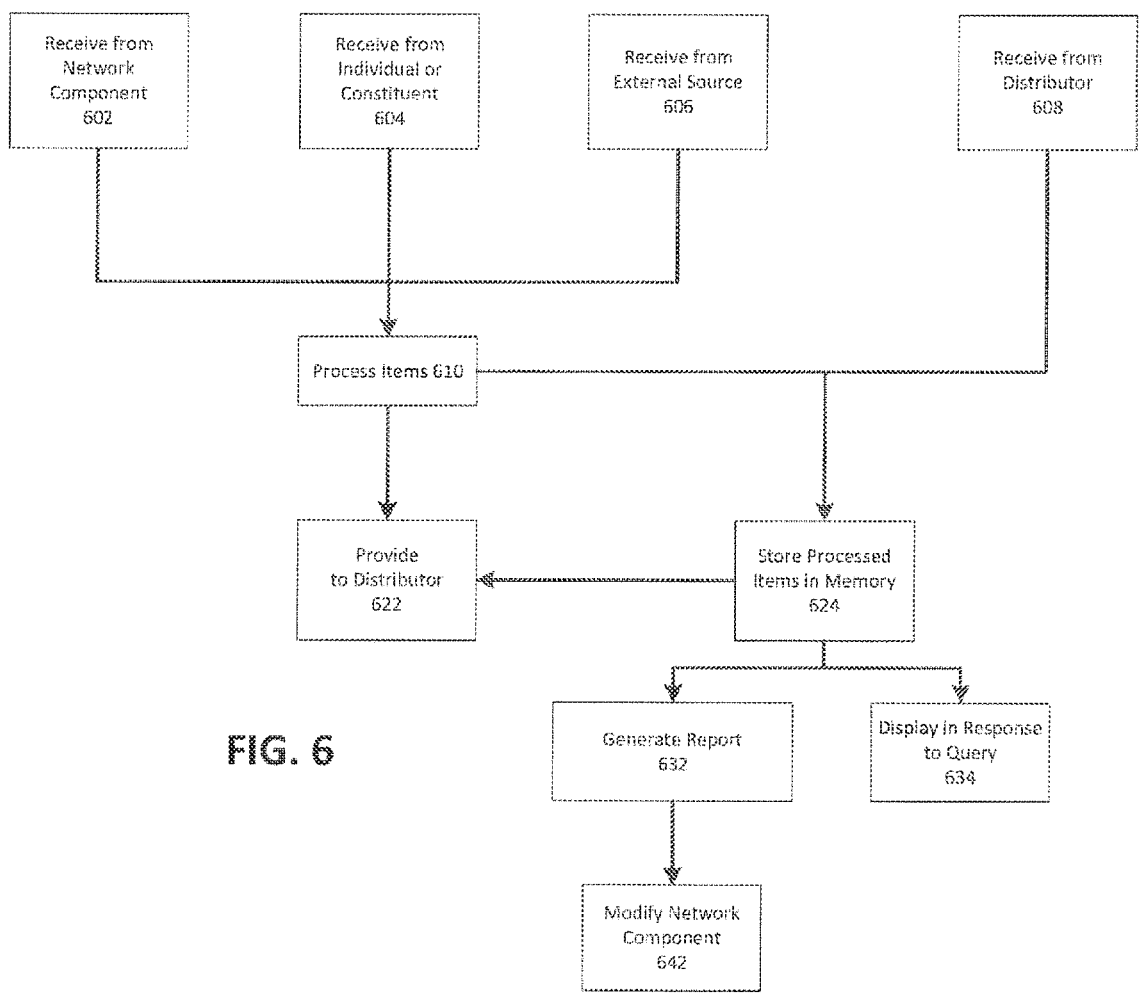
FIG. 6 depicts a flowchart illustrating an exemplary process for automated collection, dissemination, and/or reporting of cyber-threat information from a plurality of sources.

FIG. 6 depicts a flowchart illustrating an exemplary process for automated collection, dissemination, and/or reporting of cyber-threat information from a plurality of sources, consistent with disclosed embodiments. Consistent with disclosed embodiments, in steps 602, 604, and 606, cyber-threat device 130 may use accessing component 320 to retrieve cyber-threat information. As described above with respect to FIG. 4, accessing component configuration information 450 may configure accessing component 320. For example, accessing component configuration information 450 may configure accessing component 320 with authentication credentials 452 necessary to retrieve cyber-threat information. As an additional example, accessing component configuration information 450 may configure accessing component 320 to use an appropriate method for retrieving cyber-threat information. In step 602, accessing component 320 may use a web service of file system service to retrieve cyber-threat information from network components of entity network 100. In step 604, accessing component 320 may receive information provided manually by individual or constituent of the entity. For example, accessing component 320 may be configured to provide functionality for uploading documents containing cyber-threat information 305 for processing. As a further example, accessing component 320 may be configured to accept URLs or IP addresses uploaded to the system. Accessing component 320, or processing component 325, may be configured to scrape resources or web pages indicated by the provided URLs or IP addresses for cyber-threat information. In step 606, accessing component 320 may retrieve cyber-threat information 305 from an external source 150. In some aspects, accessing component 320 may implement at least one web service for retrieving information from external sources. In step 608, one or more of accessing component 230 and distributing component 330 may receive cyber-threat information from distributor 160. In certain aspects, cyber-threat device 130 may be configured to use distribution component 330 to receive cyber-threat information 305 from distributor 160. The cyber-threat device 130 may be configured to store some or all of the received cyber-threat information in memory. For example, cyber-threat device 130 may be configured to store unprocessed cyber-threat information in database of cyber-threat information 410.

Consistent with disclosed embodiments, in step 610, cyber-threat device 130 may be configured to use processing component 325 to convert cyber-threat information 305. In some aspects, processing component configuration information 460 may configure processing component 325, enabling processing component 325 to convert cyber-threat information 305. In some aspects, processing component configuration information 460 may configure processing component 325 to exclude cyber-threat information 305 meeting exclusion criteria 462. For example, processing component 325 may be configured to exclude IP addresses of the entity system 100. In certain aspects, processing component 325 may convert cyber-threat information 305 to a standard format. For example, processing component 325 may convert cyber-threat information 305 to a non-proprietary format for exchanging cyber-threat information. As an additional example, processing component 325 may convert cyber-threat information 305 to a format providing an extensible description of cyber-threat information. In some aspects, the extensible format may specify observables, context, and data markings for the processed cyber-threat information. In some embodiments, processing component 325 may convert cyber-threat information 325 to a STIX™ format. In certain embodiments, processing component 325 may convert cyber-threat information 325 to CAPEC, TDMEF, IODEF, OpenIOC, Oval, MAEC, Veris, or Yara. Processing component 325 may generate processed cyber-threat information, consistent with disclosed embodiments. In some aspects, an item of processed cyber-threat information may be generated from multiple items of unprocessed cyber-threat information. In certain aspects, multiple items of processed cyber-threat information may be generated from an item of unprocessed cyber-threat information. A processed item of cyber-threat information may not include information included in the one or more items of cyber-threat information from which it is generated.

Consistent with disclosed embodiments, in step 622, cyber-threat device 130 may be configured to use distributing component 325 to provide processed item of cyber-threat information to distributor 160. As described above with reference to FIG. 3, cyber-threat device 130 may be configured to provide processed cyber-threat information to distributor 160 in accordance with a policy enforced by policy engine 310. Distributor 160 may be distinct from entity 100a. Distributor 160 may be a clearinghouse for distributing cyber-threat information. Distributor 160 may expose an endpoint for receiving cyber-threat information. In certain aspects, the endpoint may be exposed over external network 120.

Consistent with disclosed embodiments, in step 624, cyber-threat device 130 may be configured to store processed item of cyber-threat information in memory 215. Cyber-threat device 130 may be configured to use one of more of accessing component 320, processing component 325, or distribution component 330, to store processed information in memory 215. Cyber-threat device 130 may be configured to store unprocessed cyber-threat information in database of cyber-threat information 410.

Consistent with disclosed embodiments, in step 632, cyber-threat device 130 may be configured to use reporting component 335 to generate a report describing cyber-threat information. In some aspects, the report may describe processed cyber-threat information. In certain aspects, the report may describe unprocessed cyber-threat information. In some embodiments, reporting component configuration information 480 may configure reporting component 335. For example, as described above with respect to FIG. 4, automatic reporting configuration information 482 may configure the targets, frequency, and criteria for automatically generated reports. In certain aspects, reporting component 335 may interact with displaying component 315 to provide instructions to user device 170 to display a user interface 340 for displaying the report.

Consistent with disclosed embodiments, in step 634, reporting component 335 may expose an API for providing data in response to a query. In certain aspects, a user (e.g., user 170a operating user device 170) may interact with a visualization tool or data analytics tool implemented on user device 170 to query the cyber-threat device 130 using the exposed API. Reporting component 335 may be configured to provide, in response to this query, cyber-threat information. For example, reporting component 335 may provide processed cyber-threat information. As an additional example, reporting component 335 may provide unprocessed cyber-threat information. As a further example, reporting component 335 may provide information regarding cyber threat sources; infrastructure, such as IP addresses, domain names, and mail servers; threats; and threat descriptions, such as indicators and tactics, techniques, and procedures. In some embodiments, reporting component 335 may provide summary or analyzed cyber-threat information, such as statistical information regarding cyber threats.

Consistent with disclosed embodiments, in step 642, reporting component 335 may automatically provide instructions to network components of entity 100. In certain aspects, reporting component 335 may provide instructions to network applications to cause them to reconfigure aspects of entity system 100. For example, reporting system 335 may be configured to automatically instruct email appliances to update email server blacklists. In some embodiments, one or more of cyber-threat device 130 and the instructed network component may require authorization to provide or implement automatic network configuration.

The sequence of steps disclosed above is not intended to be limiting. As would be recognized by one of skill in the art, the above-mentioned steps may be executed in an alternative order without departing from the contemplated embodiments. Similarly, steps may be added, omitted, combined, or divided without departing from the contemplated embodiments.

Examples: Apache Webserver

Consistent with disclosed embodiments, accessing component 320 may be configured to contact an Apache webserver on entity system 100. Accessing component configuration information 452 may configure accessing component 320 to call a FS library stored in libraries 420. FS library may provide functionality for navigating the file system of the Apache webserver, locating an access log file for the Apache webserver, and copying the access log file to unprocessed cyber-threat information 414.

Consistent with disclosed embodiments, processing component 325 may be configured to retrieve the access log file for the Apache webserver from unprocessed cyber-threat information 414 and call one of libraries 420 for the functionality to process the web server log file. Processing component configuration information 460 may configure processing component 325 with the format of the particular Apache webserver log file (e.g., Common Log Format). Processing component 325 may be configured to identify each request to the web server meeting identification criteria specified in processing component configuration information 460. Processing component 325 may be configured to exclude requests satisfying exclusion criteria specified in processing component configuration information 460. Processing component may be configured to create an item of processed cyber-threat information for each identified and not excluded request including the IP address for the request and the request line provided by the remote host. Processing component may store the processed cyber-threat information in processed cyber-threat information 412.

Examples: IronPort Delivery Log

Consistent with disclosed embodiments, accessing component 325 may be configured to contact an IronPort email appliance. Processing component configuration information 460 may configure processing component 330 to retrieve a delivery log file for an IronPort email security apparatus from unprocessed cyber-threat information 414 and call an IronPort conversion utility to aid processing of the IronPort delivery log file. Processing component configuration information 460 may configure processing component 330 with the format of the IronPort delivery log file. Processing component 330 may be configured to extract the Envelope From information from the delivery log file and identify values meeting identification criteria specified in processing component configuration information 460 for processing delivery logs from this IronPort email appliance. As a non-limiting example, processing component 325 may be configured to create processed cyber-threat information for each sender, including the Envelop From, Envelop to, and Source Host IP address. The processed cyber-threat information may be in STIX™.

Examples: Local Email Client

Consistent with disclosed embodiments, accessing component 325 may be configured to contact a user device (e.g., user device 170) on private network 110 of entity system 100. Accessing component configuration information 450 may configure accessing component 325 to call the FS library in libraries 420 for functionality to navigate the file system of the device, and to locate a local archive of an email client (e.g., Microsoft Outlook®, Mozilla Thunderbird®, etc.) on the user device. Accessing component configuration information 450 may configure accessing component 325 to use MAPPRPC to expose the header of the email message, the body of the email message, and any attachments to the email message. Accessing component 325 may be configured to optionally convert the exposed email from HTML, to ASCII text. Accessing component 325 may copy one or more of the header of the email message, the body of the email message, any attachments, and the ASCII file to unprocessed cyber-threat information 414.

Processing component 325 may be configured to retrieve one or more of the header of the email message, the body of the email message, any attachments, and the ASCII file from unprocessed cyber-threat information 414. Processing component configuration information 460 may configure processing component 325 to generate processed cyber-threat information. For example, processing component 325 may be configured to parse the ASCII file for IP addresses. Processing component configuration information 460 may configure processing component 325 to exclude from processing IP addresses associated with entity 100*a*.

Examples: DHS Threat Report

Consistent with disclosed embodiments, accessing component 325 may be configured to retrieve a threat report created by the Federal Bureau of Investigation or the Department of Homeland Security. In certain aspects, the threat report may be exposed by external source 150 using a web service. Accessing component configuration information 450 may configure accessing component 325 to retrieve the threat report automatically using a web service. In various aspects, the threat report may be uploaded using accessing component 325. Accessing component may store the threat report in unprocessed cyber-threat information 414.

Processing component 325 may be configured to retrieve the portable document file from the unprocessed cyber-threat information 414. Processing component configuration information 460 may configure processing component 325 to call libraries 420 providing functionality necessary to process the item of cyber-threat information. For example, processing component 325 may call a java ".pdf" library to extract content from the threat report. Processing component configuration information 460 may specify identification criteria for processing threat reports from the FBI or DHS. Processing component 325 may search the threat report according to the identification criteria using regular expressions to extract, as a non-limiting example, IP addresses, malware hashes, domain names, and/or URLs. Processing component configuration information 460 may configure processing component 325 to create one or more processed items of cyber-threat information including, for example, an indicator for the malware comprising the hash of the malware and the associated domain name, URL, and IP/or address.

In each of the above examples, processing component configuration information 460 may further configure processing component 235 to include data markings, such as information identifying the source for each item of processed cyber-threat information, and handling restrictions. Processing component may be configured to store processed cyber-threat information in processed cyber-threat information 412.

Consistent with disclosed embodiments, distribution component configuration information 470 may configure distributing component 330 to automatically provide processed cyber-threat information to distributor 160. In certain aspects, distributing component 330 may restrict distribution of some or all of the processed cyber-threat information according to a policy enforced by policy engine 310.

Consistent with disclosed embodiments, reporting component configuration information 470 may configure reporting component 330 to automatically provide processed cyber-threat information to a user device (e.g., user device 170). For example, reporting component 330 may generate an automatic report to a Security Intelligence Center of entity 100a.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims. Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead is defined by the appended claims in light of their full scope of equivalents.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

What is claimed is:

1. A device for managing cyber-threat to an entity system, comprising:
   one or more network adapters;
   at least one processor configured to perform operations comprising:
   obtaining, via the one or more network adapters, first cyber-threat information in a first format from a network component of the entity system and second cyber-threat information in a second format from a distributor external to the entity system, the distributor being configured to collect and share the second cyber-threat information in the second format, the network component of the entity system being configured to expose an Application Program Interface (API) to collect at least a portion of the first cyber-threat information;
   converting, based on exclusion criteria to exclude from further processing, the first cyber-threat information into processed first cyberthreat information in a third format and the second cyber-threat information into processed second cyber-threat information in the third format such that (i) the at least one processor uses the exclusion criteria to identify one or more first portions of the first cyber-threat information and one or more second portions of the second cyber-threat information as portions to be excluded from conversion to the third format and (ii) the at least one processor converts other portions of the first and second cyber-threat information to the third format while avoiding performing conversion of the one or more first portions and the one or more second portions based on the one or more first portions and the one or more second portions being identified by the at least one processor as being portions to be excluded;
   combining the processed first cyber-threat information and the processed second cyber-threat information into combined cyber-threat information; and
   automatically instructing the network component of the entity system to reconfigure the network component in response to the combined cyberthreat information.

2. The device of claim 1, the third format comprising:
   a first data marking indicating a categorization of the first cyber-threat information;
   a second data marking indicating an expiration of the first cyber-threat information; and
   a context comprising detection and remediation procedures for cyber-attacks associated with the first cyber-threat information.

3. The device of claim 1, wherein the operations further comprise extracting, from the combined cyber-threat information, information identifying the combined cyber-threat information based on stored identification criteria.

4. The device of claim 1, wherein the operations further comprise enforcing policy rules specifying at least one of:
   a user authorized to access the combined cyber-threat information;
   a type of combined cyber-threat information; or
   permissible uses of accessed items of the combined cyber-threat information.

5. The device of claim 1, wherein the operations further comprise applying the exclusion criteria to further determine acceptable cyber-threat information from the first and second cyber-threat information.

6. The device of claim 1, wherein the one or more network adapters are further configured with a credential for accessing at least one of an internal cyber-threat information source, an external cyber-threat information source, or a second distributor.

7. The device of claim 6, wherein the credential comprises an authentication token supporting authentication.

8. The device of claim 1, wherein the third format comprises an extensible cyber-threat information description specifying observables and context for the first and second cyber-threat information.

9. The device of claim 1, wherein the one or more network adapters are further configured to call an API library to receive the first cyber-threat information.

10. The device of claim 1, wherein the network component of the entity system comprises a firewall appliance, router, email appliance, webserver, or proxy server.

11. A method for managing cyber-threat to an entity system, comprising:
obtaining, at a server, using one or more network adapters first cyber-threat information in a first format from a network component of the entity system and second cyber-threat information in a second format from a distributor external to the entity system, the distributor being configured to collect and share the second cyber-threat information in the second format, the network component of the entity system being configured to expose an Application Program Interface (API) to collect at least a portion of the first cyber-threat information;
converting, by the server, based on exclusion criteria to exclude from further processing, the first cyber-threat information into processed first cyber-threat information in a third format and the second cyber-threat information into processed second cyber-threat information in the third format such that (i) the exclusion criteria is used to identify one or more first portions of the first cyber-threat information and one or more second portions of the second cyber-threat information as portions to be excluded from conversion to the third format and (ii) the converting converts other portions of the first and second cyber-threat information to the third format while avoiding performing conversion of the one or more first portions and the one or more second portions based on the one or more first portions and the one or more second portions being identified as being portions to be excluded;
combining the processed first cyber-threat information and the processed second cyber-threat information into combined cyber-threat information; and
automatically instructing the network component of the entity system to reconfigure the network component in response to the combined cyber-threat information.

12. The method of claim 11, the third format comprising:
a first data marking indicating a categorization of the first cyber-threat information;
a second data marking indicating an expiration of the first cyber-threat information; and
a context comprising detection and remediation procedures for cyber-attacks associated with the first cyber-threat information.

13. The method of claim 11, further comprising extracting, from the combined cyber-threat information, information identifying the combined cyber-threat information based on stored identification criteria.

14. The method of claim 11, further comprising applying the exclusion criteria to further determine acceptable cyber-threat information from the first and second cyber-threat information.

15. The method of claim 11, wherein the one or more network adapters are further configured with a credential for accessing at least one of an internal cyber-threat information source, an external cyber-threat information source, or a second distributor.

16. One or more non-transitory computer-readable media comprising instructions that, when executed by one or more processors, cause operations comprising:
obtaining, using one or more network adapters first cyber-threat information in a first format from a network component of an entity system and second cyber-threat information in a second format from a distributor external to the entity system, the distributor being configured to collect and share the second cyber-threat information in the second format, the network component of the entity system being configured to expose an Application Program Interface (API) to collect at least a portion of the first cyber-threat information;
in connection with obtaining the first cyber-threat information and the second cyber-threat information, using exclusion criteria to identify one or more first portions of the first cyber-threat information and the second cyber-threat information to be excluded from processing while converting one or more second portions of the first cyber-threat information and the second cyber-threat information that was not identified as to be excluded from further processing into processed first cyber-threat information and processed second cyber-threat information in a third format;
combining the processed first cyber-threat information and the processed second cyber-threat information into combined cyber-threat information; and
automatically instructing the network component of the entity system to reconfigure the network component in response to the combined cyber-threat information.

17. The media of claim 16, the third format comprising:
a first data marking indicating a categorization of the first cyber-threat information;
a second data marking indicating an expiration of the first cyber-threat information; and
a context comprising detection and remediation procedures for cyber-attacks associated with the first cyber-threat information.

18. The media of claim 16, the operations further comprising extracting, from the combined cyber-threat information, information identifying the combined cyber-threat information based on stored identification criteria.

19. The media of claim 16, the operations further comprising applying the exclusion criteria to further determine acceptable cyber-threat information from the first and second cyber-threat information.

20. The media of claim 16, wherein the one or more network adapters are further configured with a credential for accessing at least one of an internal cyber-threat information source, an external cyber-threat information source, or a second distributor.

* * * * *